(12) United States Patent
Yoshimura

(10) Patent No.: US 6,516,304 B1
(45) Date of Patent: Feb. 4, 2003

(54) SYSTEM COMPONENT CHARGING AND ACCOUNTING SYSTEM

(75) Inventor: Miki Yoshimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/261,224

(22) Filed: Mar. 3, 1999

(30) Foreign Application Priority Data

Mar. 4, 1998 (JP) .......................................... 10-051823

(51) Int. Cl.⁷ .............................................. G06F 17/60
(52) U.S. Cl. ..................................................... 705/52
(58) Field of Search .............................. 705/52, 59, 1; 358/269; 717/1; 713/200, 201

(56) References Cited

U.S. PATENT DOCUMENTS

| | | | |
|---|---|---|---|
| 4,796,181 A | * 1/1989 | Wiedemer | 705/52 |
| 5,146,344 A | * 9/1992 | Bennett et al. | 358/296 |
| 5,438,508 A | * 8/1995 | Wyman | 705/8 |
| 5,964,876 A | * 10/1999 | Shimomura et al. | 713/200 |
| 6,021,492 A | * 2/2000 | May | 713/200 |
| 6,192,348 B1 | * 2/2001 | Mrva et al. | 705/52 |

FOREIGN PATENT DOCUMENTS

| | | | |
|---|---|---|---|
| JP | 407261868 A | * 10/1995 | |
| JP | 8-6660 | 1/1996 | |

OTHER PUBLICATIONS

Malhotra, Yogesh; Controlling copy right infringements of intellectual property: The case of computer software—Part two; Jul. 1994; Journal of Systems Management v45n7 pp: 12–17; Dialog copy pp. 1–11.*

* cited by examiner

Primary Examiner—Thomas A. Dixon
(74) Attorney, Agent, or Firm—Oblon, Spivak, McClelland, Maier & Neustadt, P.C.

(57) ABSTRACT

At least one storage unit is used for storing software which is divided into a plurality of software components. At least one CPU controls hardware components of an image processing apparatus by running the plurality of software components cooperatively. Each software component of the plurality of software components has a charging function such that a charge for the software component is cumulatively increased each time the software component is run.

13 Claims, 9 Drawing Sheets

SYSTEM COMPONENT CHARGING AND ACCOUNTING SYSTEM

BACKGROUND OF THE INVENTION

1. Field of the Invention

An image input/output apparatus includes a feeder unit which feeds original-image paper to be read and sets it in a reading unit one by one, a scanner unit which performs a reading operation, a storage unit which stores read image data, a paper-feeding tray unit which feeds printing paper and sets it in a writing unit, a plotter unit which performs a writing operation, a paper-ejecting bin unit which is used for distributing and putting printed paper thereon, and so forth. Software for controlling the hardware components, which are mounted in OA (Office Automation) equipment, such as the above-described image input/output apparatus, is divided into a plurality of software components. The present invention relates to a control system, and, in particular, to a control system which controls such OA equipment by running the plurality of software components cooperatively.

2. Description of the Related Art

As such a kind of control system in the related art, for example, a charging system is disclosed in Japanese Laid-Open Patent Application No. 8-6660 filed on Jun. 23, 1994.

This system is a charging system which obtains charging information for each user by totalizing utilization states of a computer system individually for each user. This charging system is provided with software-charging managing means which cumulatively adds utilization values of necessary existent software components to the above-mentioned charging information when a newly designed software product is produced.

The charging system for the computer system has a hardware arrangement which mainly includes a central processing unit, a user operation terminal for a user to input instructions for a software-merging operation, a produced-by-user-software storage unit for storing software which the user has produced, a software-component storage unit for storing existent software components which are used by the user, a charging-information storage unit for storing charging information for each user, a merged-software storage unit for storing a software product which has undergone a merging operation, an operation system for controlling the computer system, a software merging unit which merges the software components, and a charging unit which updates the charging information for each user.

In this computer system, a software merging request and a user name, which have been input to the operating system from the user operation terminal via a signal line, are transmitted to the software merging unit from the operating system via a signal line.

In response thereto, first, the software merging unit reads software, which was produced by the user and will be merged, from the produced-by-user-software storage unit via a signal line. Then, the software merging unit analyzes the thus-read software, obtains software components which are necessary for producing an intended software product, and reads all the thus-obtained necessary software components and the utilization charges as well, which utilization charges were prescribed for these software components from the software-component storage unit via a signal line.

Then, the software merging unit sums all the thus-read utilization charges, and informs the charging unit, via a signal line, of the thus-obtained sum and the user name, received from the operation system. Then, the software merging unit merges the software produced by the user and the necessary software components, and stores the thus-produced software in the merged-software storage unit.

Finally, the charging unit reads, from the charging-information storage unit, the charging information for the user of the user name, which the charging unit was informed of, cumulatively adds the utilization charges to the charging information, which utilization charges the charging unit was informed of, and stores the thus-obtained new charging information in the charging-information storage unit via a signal line.

In a control system in the related art, each function is charged, and the same charge is charged for the same function even if completely different devices are used for executing the function. As a result, a user is required to pay the fixed charge regardless of a matter as to which devices are actually used.

Further, because a counter is not provided for each hardware component, the utilization charge is charged regardless of a matter as to whether or not particular hardware components are actually used. As a result, a user is required to pay the fixed utilization charge regardless of a matter as to which software components are actually run.

SUMMARY OF THE INVENTION

The present invention is directed to eliminating these problems, and an object of the present invention is to provide a control system which charges for each software component of software which is incorporated in OA equipment or the like so that it is possible that a user pays charges in accordance with a matter as to which devices are actually used.

Further, another object of the present invention is to provide a control system by which it is possible that a user pays charges for the software components which are actually run.

Further, another object of the present invention is to provide a control system by which charging can be appropriately performed even when a charging method is changed due to replacement or upgrade of any particular software component, or expansion of a function or a special order for an individual function of a product itself is requested and achieved.

A control system, according to the present invention comprises:

at least one storage unit in which software is stored, the software being divided into a plurality of software components; and at least one CPU which controls hardware components of an image processing apparatus by running the plurality of software components cooperatively, wherein each software component of the plurality of software components has a charging function such that a charge for the software component is cumulatively increased according to a state in which the software component is run.

In this arrangement, the charge for each software component is cumulatively increased in accordance with a state in which the software is run, and charging is managed for each software component of the software incorporated in the image processing apparatus. As a result, it is possible that a user pays charges in accordance with a matter as to which devices are actually used.

Further, as a result of the charge for each software component being cumulatively increased in accordance with a state in which the software is run, it is possible that a user pays the appropriate utilization charges only for the software components which are actually run.

Further, charging can be appropriately performed even when a charging method is changed due to replacement or upgrade of any particular software component, or expansion of a function or a special order for an individual function of the product (image processing apparatus) itself which is requested and achieved.

Specifically, in the related art, charging is performed for a function. As a result, when different software components are run for executing the same function, the same charging is performed. In the present invention, such a problem is eliminated. In the present invention, regardless of a matter as to which function (a composite apparatus of copier, facsimile machine, printer, and so forth has many functions) the software components are run for, charging can be managed for each software component.

Each software component of the plurality of software components may have a data structure which includes a component identifier which is previously registered for the software component, and a unit price which is added to the charge for the software component each time the software component is run.

In this arrangement, the charge for each software component is cumulatively increased each time the software is run by using the unit price, and charging is managed for each software component of the software incorporated in the image processing apparatus through the component identifier. As a result, it is possible that a user pays charges in accordance with a matter as to which devices are actually used.

Further, as a result of the charge for each software component being cumulatively increased each time the software is run by using the unit price, it is possible that a user pays the appropriate utilization charges only for the software components which are actually run.

Further, by replacing or changing the unit price or the component identifier (component ID), charging can be appropriately performed even when a charging method is changed due to replacement or upgrade of any particular software component, or expansion of a function or a special order for an individual function of the product (image processing apparatus) itself which is requested and achieved.

Specifically, in the related art, charging is performed for a function. As a result, when different software components are run for executing the same function, the same charging is performed. In the present invention, such a problem is eliminated. In the present invention, regardless of a matter as to which function (a composite apparatus of copier, facsimile machine, printer, and so forth has many functions) the software components are run for, charging can be managed for each software component.

The plurality of software components may comprise software components, each of which is run for controlling a respective one of the plurality of hardware components.

Thereby, charging for use of the hardware components is performed as a result of the charging functions of the corresponding software components being executed, respectively. As a result, it is not necessary to provide a counter for each hardware component for charging therefor. Further, as a result of the use of the hardware components being managed through the corresponding software components, respectively, when the manner of charging for each hardware component is changed, charging for the hardware components can be appropriately performed, by appropriately changing the data of the corresponding software components.

Further, charging is performed for the hardware components in accordance with the states in which the corresponding software components are run, respectively. Thus, as a result of charging being managed for each software component of the software incorporated in the image processing apparatus, it is possible that a user pays charges in accordance with a matter as to which hardware components are actually used.

Further, as described above, charging is performed for the hardware components in accordance with the states in which the corresponding software components are run. As a result, it is possible that a user pays the appropriate utilization charges only for the software components which are actually run.

Further, charging can be appropriately performed even when a charging method is changed due to replacement or upgrade of any particular software component or any particular hardware component, or expansion of a function or a special order for an individual function of the product (image processing apparatus) itself which is requested and achieved.

Specifically, in the related art, charging is performed for a function. As a result, when different software components are run for executing the same function, the same charging is performed. In the present invention, such a problem is eliminated. In the present invention, regardless of a matter as to which function (a composite apparatus of copier, facsimile machine, printer, and so forth has many functions) a software component is run for, charging can be managed for each software component corresponding to the respective hardware component.

The charges of respective software components of the plurality of software components may be totalized as a result of instructions of the respective software components being chained.

Thereby, merely as a result of the instructions of the first software component being called for, the charges of all the respective software components are cumulatively added in sequence so that the totalization of the charges of all the respective software components is performed.

The charges of respective software components of the plurality of software components may be totalized as a result of instructions of each of the respective software components being directly called for by one of the CPU and another CPU.

A control system, according to another aspect of the present invention, comprises:

a plurality of image processing apparatuses, in each of which software is incorporated, which software is divided into a plurality of software components, which are run so that functions of the apparatus are executed, each software component of the plurality of software components having a charging function such that a charge for the software component is cumulatively increased in accordance with a state in which the software component is run; and a service center which is connected with the plurality of image processing apparatuses, the service center totalizing, for each user, the charges of the respective software components incorporated in the plurality of image processing apparatuses.

As a result, it is possible to separate the utilization charge of each software component and the total of charges which each user is charged. This is because the charges of the respective software components are included in each apparatus of the plurality of image processing apparatuses, while the total of charges which each user is charged is included in the service center which is connected with each apparatus of the plurality of image processing apparatuses. Thereby, charging can be performed appropriately, even when the charging method in accordance with the utilization state of the user is changed due to expansion of functions and/or upgrade of apparatuses, as a result of the software components being appropriately changed, the data of the respective software components being appropriately changed, the sum of the total utilization charges of the respective apparatuses for each user being appropriately changed and/or the like.

Other objects and further features of the present invention will become more apparent from the following detailed descriptions when read in conjunction with the accompanying drawings.

DETAILED DESCRIPTION OF THE PREFERRED EMBODIMENT

Figure 1A:
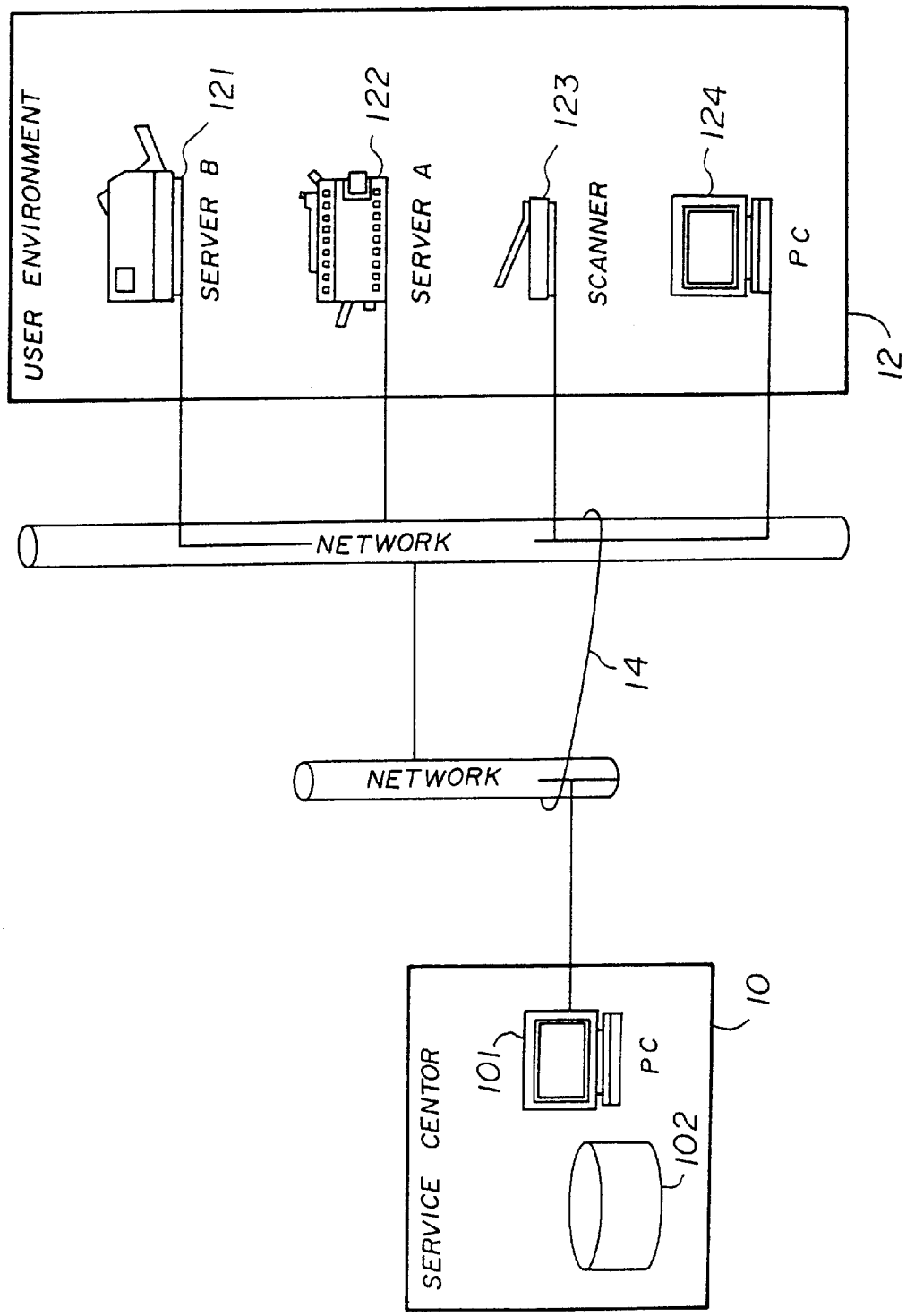
FIG. 1A shows a block diagram for illustrating a system environment (network environment) of a computer system in one embodiment of a control system according to the present invention.

In a computer system in one embodiment of a control system according to the present invention, software for controlling hardware which is incorporated in OA equipment is divided into a plurality of software components, and, the plurality of software components are run cooperatively so that image input/output apparatuses 12, shown in FIG. 1A, are controlled. Each of the software components has a charging function of cumulatively increasing an utilization charge each time the software component is run.

Specifically, as the OA equipment, as shown in FIG. 1A, there are image input/output apparatuses 12 such as a copier (server A) 122, a facsimile machine (not shown in the figure), a printer (server B) 121, a scanner 123, and so forth. Each image input/output apparatus has a combination of hardware of a feeder unit which feeds original-image paper to be read and sets it in a reading unit, one by one, a scanner unit which performs a reading operation, a storage unit which stores read image data, a paper-feeding tray unit which feeds printing paper and sets it in a writing unit, a plotter unit which performs a writing operation, a paper-ejecting bin unit which is used for distributing and putting printed paper thereon and so forth.

FIG. 1A shows a block diagram for illustrating a system environment (network environment 14) of the computer system in the embodiment, which acts as a charging system, to which the control system according to the present invention is applied.

The image input/output apparatus such as the copier (server A) 122, the facsimile machine, the printer (server B) 121, the scanner 123 or the like has been used in a standing-alone manner or a one-by-one connected manner. However, recently, the apparatus is often used in a manner in which the apparatus is connected to a network 14, as shown in FIG. 1A.

Figure 1B:
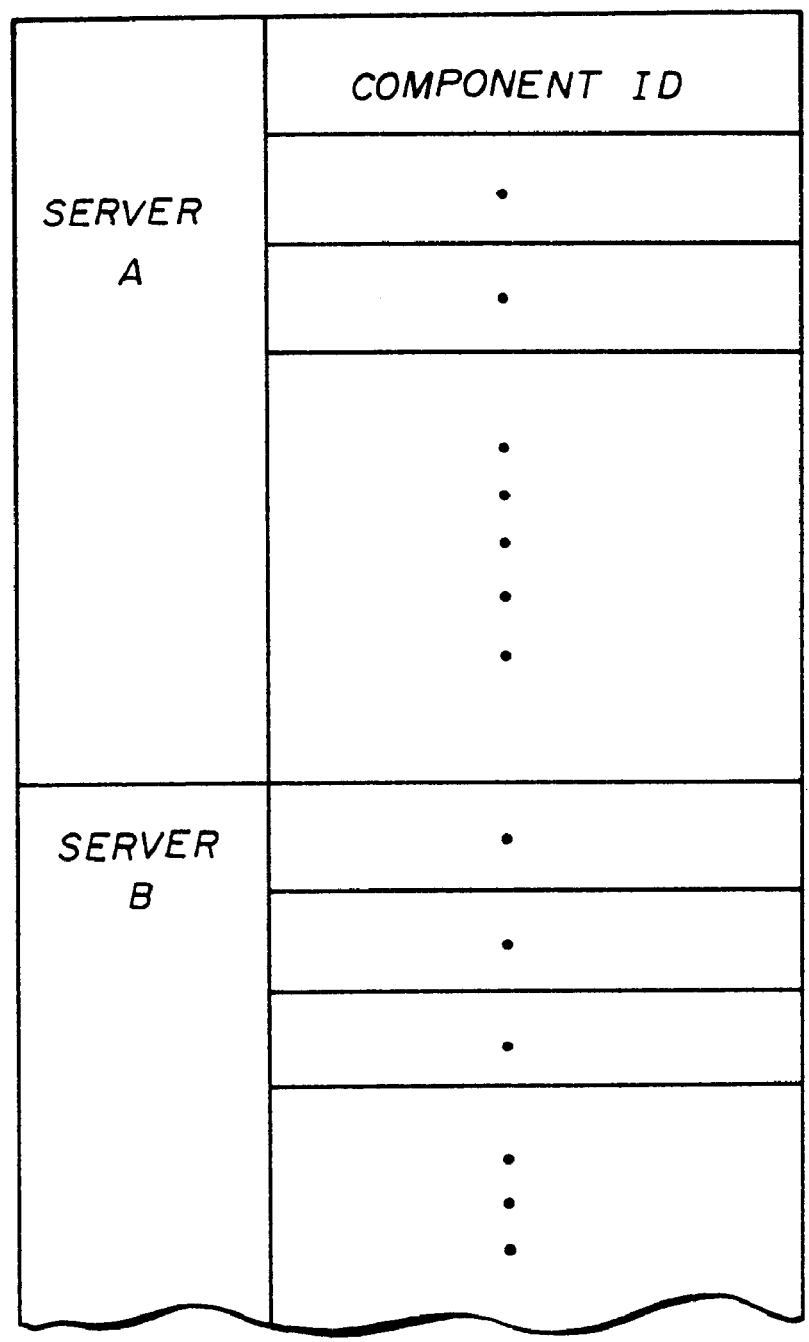
FIG. 1B shows a table for managing software components, which table is managed by a service center.
Figure 2:
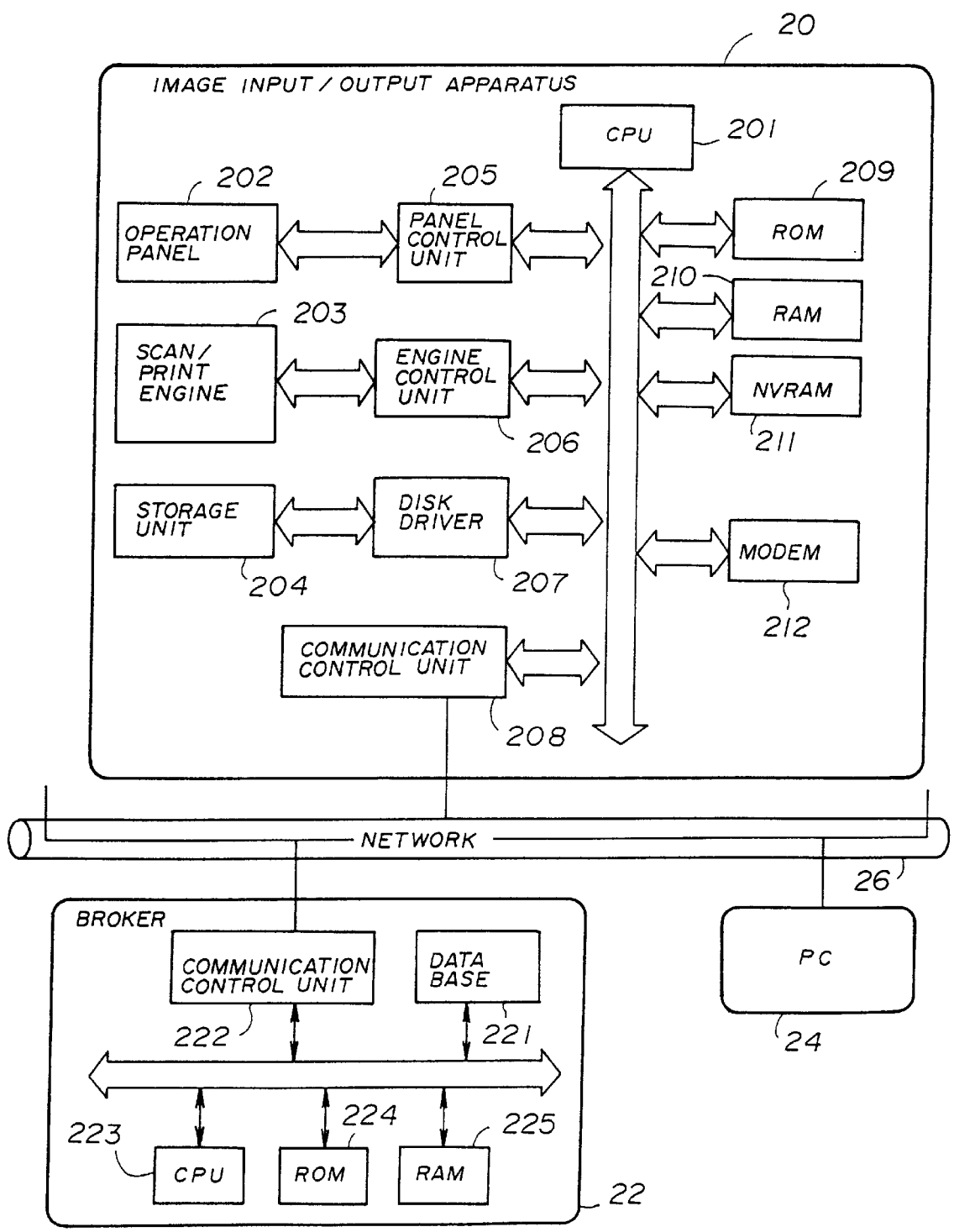
FIG. 2 shows one example of a hardware arrangement of a broker and one example of one apparatus of image input/output apparatuses in the system environment in the embodiment of the present invention.

The computer system in the embodiment of the control system according to the present invention includes a service center 10 which manages a table, shown in FIG. 1B, of software components which are incorporated in the respective apparatuses of the image input/output apparatuses 12, in a case where the service center 10 includes a broker 22 (shown in FIG. 2).

As shown in FIG. 1A, the service center 10 is provided with a storage unit 102 for storing the above-mentioned table of software components, in the case where the service center 10 includes the broker 22. Further, the service center 10 is provided with a personal computer (PC) 101. The PC 101 manages the table of software components, in the case where the service center 10 includes the broker 22. The service center 10 provides services concerning operation states and utilization states of the apparatuses 12 (121, 122, 123, 124, and so forth) as a result of remotely controlling the apparatuses 12 via the network 14.

In this arrangement, in the case where the service center 10 includes the broker 22, in response to a request for a total utilization charge by the service center 10, each of the image input/output apparatuses 12 totalizes the utilization charges of all the software components incorporated therein and the thus-obtained total utilization charge is reported to the service center 10, from each of the image input/output apparatuses 12, via the network 14. As a result of the service center 10 obtaining the total utilization charges via the network, it is possible to separate charging information of each software component and the total utilization charges. Thereby, charging can be performed appropriately, even when the charging method in accordance with the utilization states of users is changed due to expansion of functions and/or upgrade of apparatuses, as a result of the software components being appropriately changed, the data of the respective software components being appropriately changed, the manner of further totalization of the total utilization charges for each user being appropriately changed, and/or the like.

FIG. 2 shows one example of a hardware arrangement of the broker 22 (which is, in this example, included in the service center 10, shown in FIG. 1A) and one example a hardware arrangement of one apparatus of the image input/output apparatuses 12.

The hardware arrangement of an image input/output apparatus 20, which is the example of the image input/output apparatuses 12, will now be described.

A processor (CPU) 201 controls the entirety of the apparatus. The processor 201 is connected with a ROM 209, a RAM 210, an NVRAM 211, an operation panel 202 and a panel control unit 205, a scan/print engine 203 and an engine control unit 206, a storage unit 204 and a disk driver 207, a communication control unit 208, and a modem 212, which operate under the control by the CPU 201.

In the ROM 209, static data such as a program codes, fonts, and so forth are stored.

The RAM 210 is used as a temporary storage area.

The NVRAM 211 is used for storing data which should not be volatile.

The operation panel 202 and the panel control unit 205 act as an interface with a user.

The scan/print engine 203 and the engine control unit 206, acting as an image-data input/output unit, reads an original-image paper and prints out the thus-read image data onto printing paper.

The storage unit 204 and the disk driver 207 are used for storing a large amount of image data or a database.

The communication control unit 208 is connected with a network 26 (corresponding to the network 14 shown in FIG. 1A) such as Ethernet, and enables communications with external equipment (such as the broker 22 and a personal computer (PC) 24).

The modem 212 is connected with a public line (specifically, a telephone line or an ISDN line) and enables communications with external equipment.

The hardware arrangement of the broker 22 will now be described.

The broker 22 maintains function information and management information concerning the image input/output apparatus 20 which is connected with the network 26, and establishes connection between a client (the PC 24, in this example) and a server (the image input/output apparatus 20, in this example).

The broker 22 includes a CPU 223, a ROM 224, a RAM 225, a communication control unit 222 and a database (stored in, for example, a hard disk drive). Either the PC 101 or any apparatus of the image input/output apparatuses 12, shown in FIG. 1, may act as the broker 22.

Figure 3:
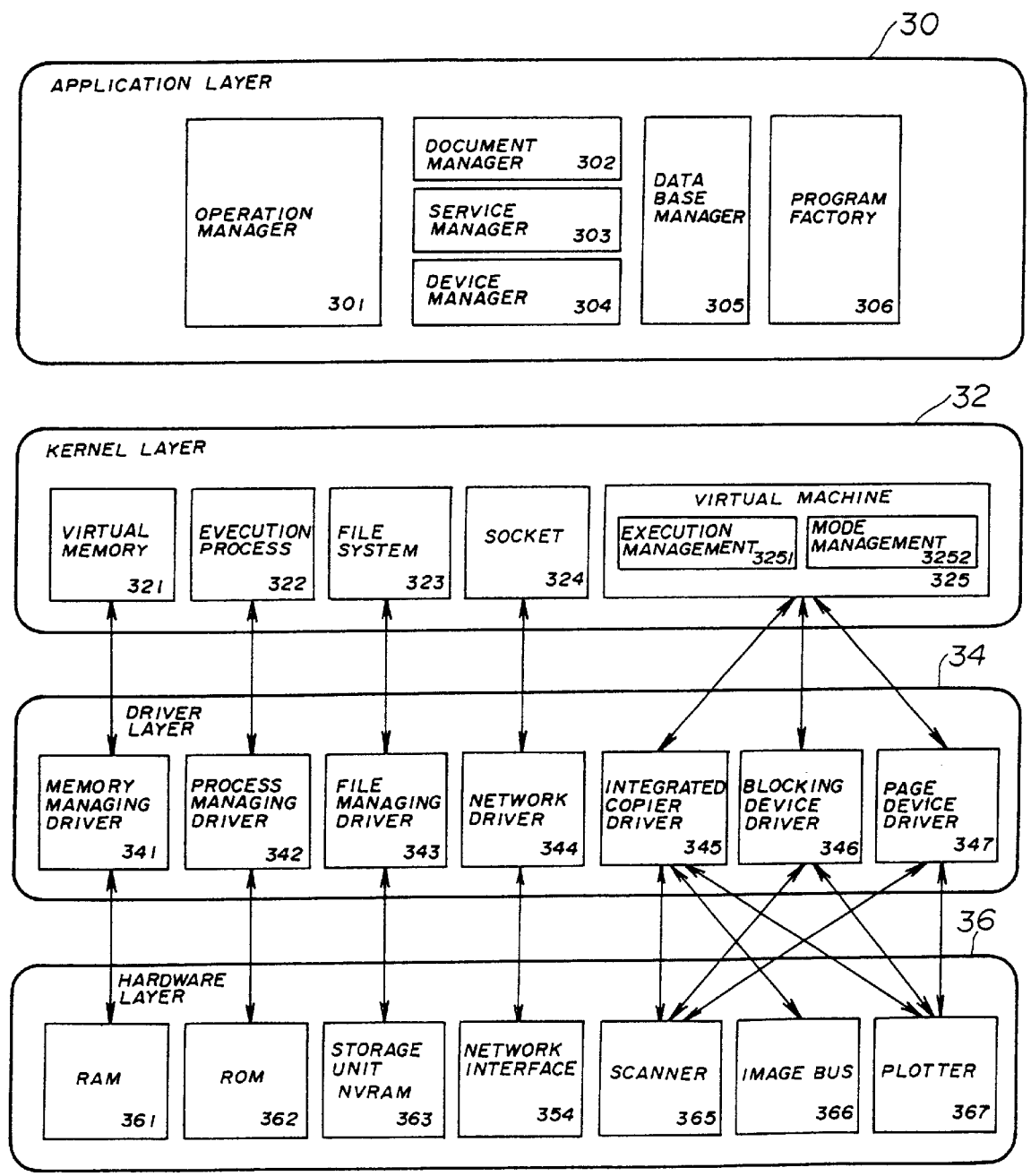
FIG. 3 shows one arrangement of software which is stored in a ROM of the image input/output apparatus shown in FIG. 2.

FIG. 3 shows one arrangement of software which is stored in the ROM 209 of the image input/output apparatus 20.

The software stored in the ROM 209 of the image input/output apparatus 20 includes, in general, 3 layers: an application layer 30, a kernel layer 32, and a driver layer 34.

The application layer 30 is a layer which forms applications of a copier, a facsimile machine, a printer, scanner and so forth.

A document manager 302 acts as a central functional block in the application layer 30, and handles documents in accordance with the operation sequences of the copier, facsimile machine, printer, scanner and so forth.

A service manager 303 is a functional block which is needed in common at the time of the document handling, and manages and provides various services.

A device manager 304 is a functional block which determines operations of physical devices such as the scanner, the plotter and the image bus, and gives instructions to the various devices and monitors the operations of the devices.

An operation manager 301 controls the operation panel attached to the apparatus, and performs display of buttons, notification of button operations, informing of alerts, and so forth.

A database manager 305 maintains and manages data, which should be permanent, such as fonts, fixed forms, a facsimile reception history, apparatus utilization history and so forth.

In this embodiment, the database manager 305 maintains and manages, as data which should be permanent, information of the software components, the charging information thereof, and the total utilization charges.

A program factory 306 performs initialization for running the software components.

Specifically, the program factory 306 develops the software components, which statically exist in the ROM 209, to the RAM 210, and cause the software components to enter a condition in which the software components can be run as a result of receiving some messages.

The kernel layer 32 is usually incorporated as a kernel of an OS (Operation System), performs abstraction of the various devices so as to obtain a virtual memory 321, an execution process 322, a file system 323, a socket 324, a virtual machine 325 (execution management 3251 and mode management 3252) and so forth, and provides their services to the applications.

The application layer 30 operates as a result of a system call being performed on the kernel layer 32.

A driver layer 34 is a collection of functional blocks which perform control for driving various hardware, and is provided with a memory managing driver 341, a process managing driver 342, a file managing driver 343, a network managing driver 344, an integrated copier driver 345, a blocking device driver 346, a page device driver 347 and so forth.

A hardware layer 36 is a collection of resources, which exist in the image input/output apparatus 20 and can be controlled. The hardware layer 36 is provided with a RAM 361, a ROM 362, a storage device and an NVRAM 363 (corresponding to the RAM 210, ROM 209, storage unit 204 and NVRAM 211), a network interface 364 (corresponding to the communication control unit 208), and a scanner 365, an image bus 366 and a plotter 367 (corresponding to the scan print engine 203), and so forth.

Figure 4:
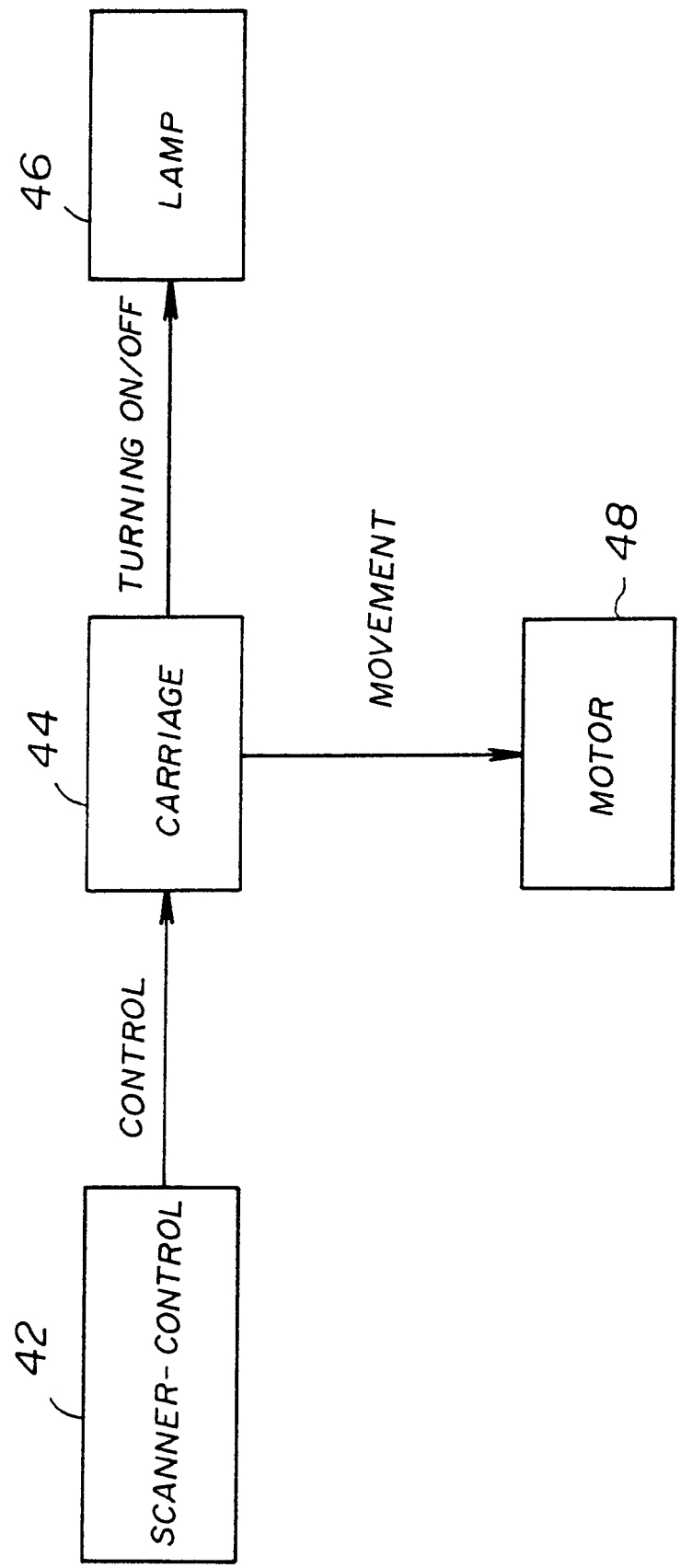
FIG. 4 shows an arrangement of software components, for controlling an operation of a carriage for image reading, incorporated in the image input/output apparatus shown in FIG. 2.

FIG. 4 shows an arrangement of software components, for controlling an operation of a carriage for an image reading operation, incorporated in the image input/output apparatus 20.

A scanner-control software component 42 is a software component for controlling a carriage software component 44, that is, for giving instructions to the carriage software component 44 in accordance with a resolution and a reading range.

The carriage software component 44 is a software component for giving instructions of a moving speed of the carriage and so forth to a motor software component 48, giving instructions of turning on/off exposure lamps to a lamp software component 46, and, thus, performing and monitoring the operations of the carriage.

The motor software component 48 is a software component for driving a stepper motor or the like so as to move the carriage.

The lamp software component 46 is a software component for turning on/off the respective exposure lamps.

Figure 5:
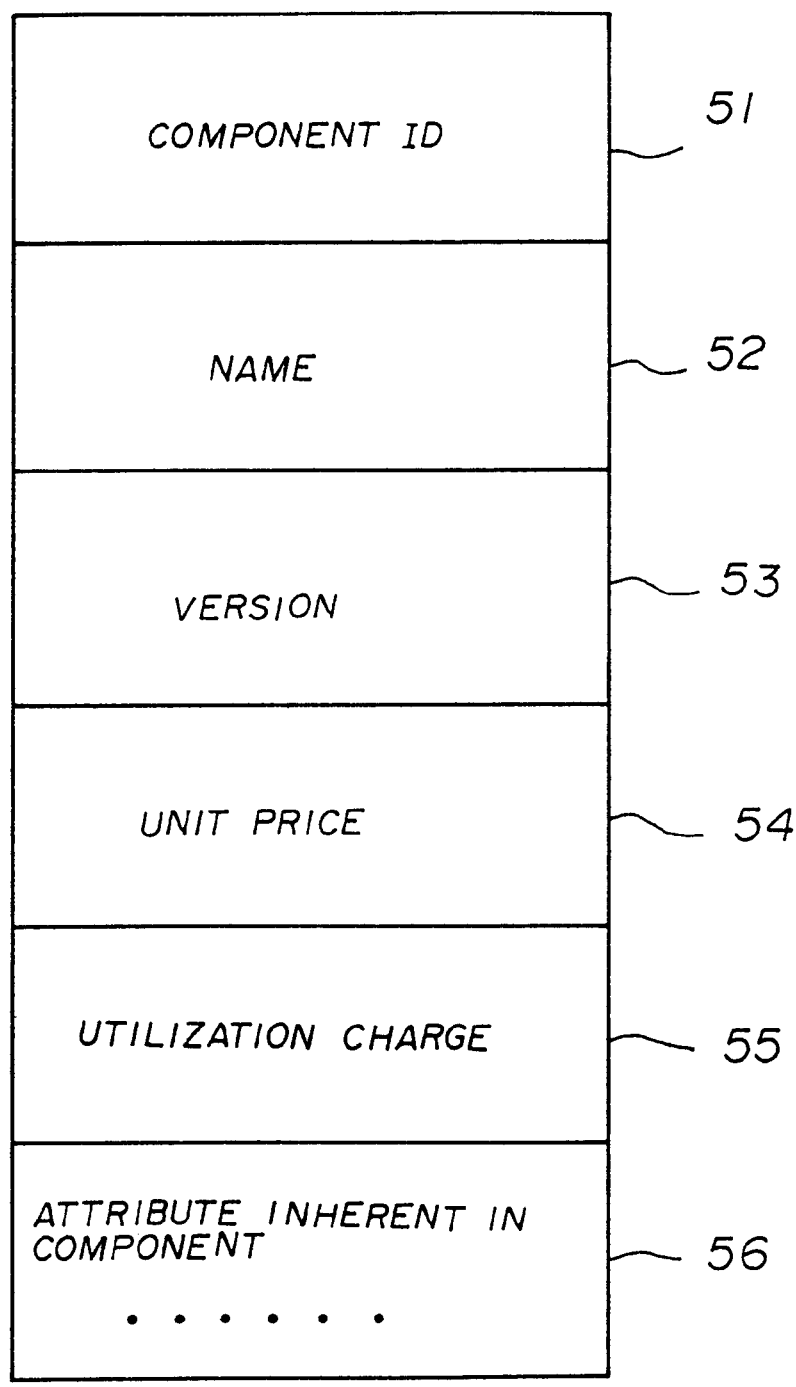
FIG. 5 shows an example of a data structure of each software component.

With reference to FIG. 5, one example of a data structure of each software component will now be described.

Each software component has the data structure which includes a component identifier (component ID) 51 which is previously registered for each software component, and a unit price 54 for every time of running of the software component.

Thereby, in the control system in the embodiment of the present invention, the specification of each software component is managed by using the component identifier (component ID) 51 included in the data structure, and, also, a charging function for each software component is executed by using the unit price 54.

As mentioned above, the component identifier (component ID) 51 is an arbitrary identifier which is previously registered for each software component.

Usually, each component identifier 51 is a number with 6 figures, or the like, and is unitarily managed by a vender which provides the apparatus.

The vender manages the specification of each software component by using the component identifier (component ID) 51 thereof.

Name information 52 is a name of the software component.

Usually, each name information 52 is an arbitrary length of a character string, for example, "carriage".

Version information 53 is a version for each component identifier (component ID) 51.

Usually, each version information 53 is a number with three figures, or the like, for example, "301" which is recognized as a version 3.01.

As mentioned above, the unit price 54 is a charge for every time of running of the software component.

A utilization charge 55 is a current utilization charge, and the unit price is added to the utilization charge 55 every time the software component is run.

Information 56 of an attribute value inherent in each software component is data which is necessary for the software component.

By using the unit price 54 and the component identifier (component ID) 51, charging is managed for each software component when the software incorporated in the image input/output apparatus 20 is used. As a result, it is possible that a user pays charges in accordance with a matter as to which devices are actually run.

Further, by using the unit price 54 and the component identifier (component ID) 51, it is possible that a user pays the appropriate utilization charges only for the software components which are actually run.

Further, by appropriately replacing or changing the unit price 54 or the component identifier (component ID) 51, charging can be appropriately performed even when a charging method is changed due to replacement or upgrade of any particular software component, or expansion of a function or a special order for an individual function of the product (image input/output apparatus 20) itself which is requested and achieved.

Specifically, in the related art, charging is performed for a function. As a result, when different software components are run for executing the same function, the same charging is performed. In the present invention, such a problem is eliminated. In the present invention, regardless of a matter as to which function (a composite apparatus of copier, facsimile machine, printer, and so forth has many functions) a software component is run for, when the software component is the same, the same charging is performed for the software component. Thus, charging can be managed for each software component.

Figure 6:
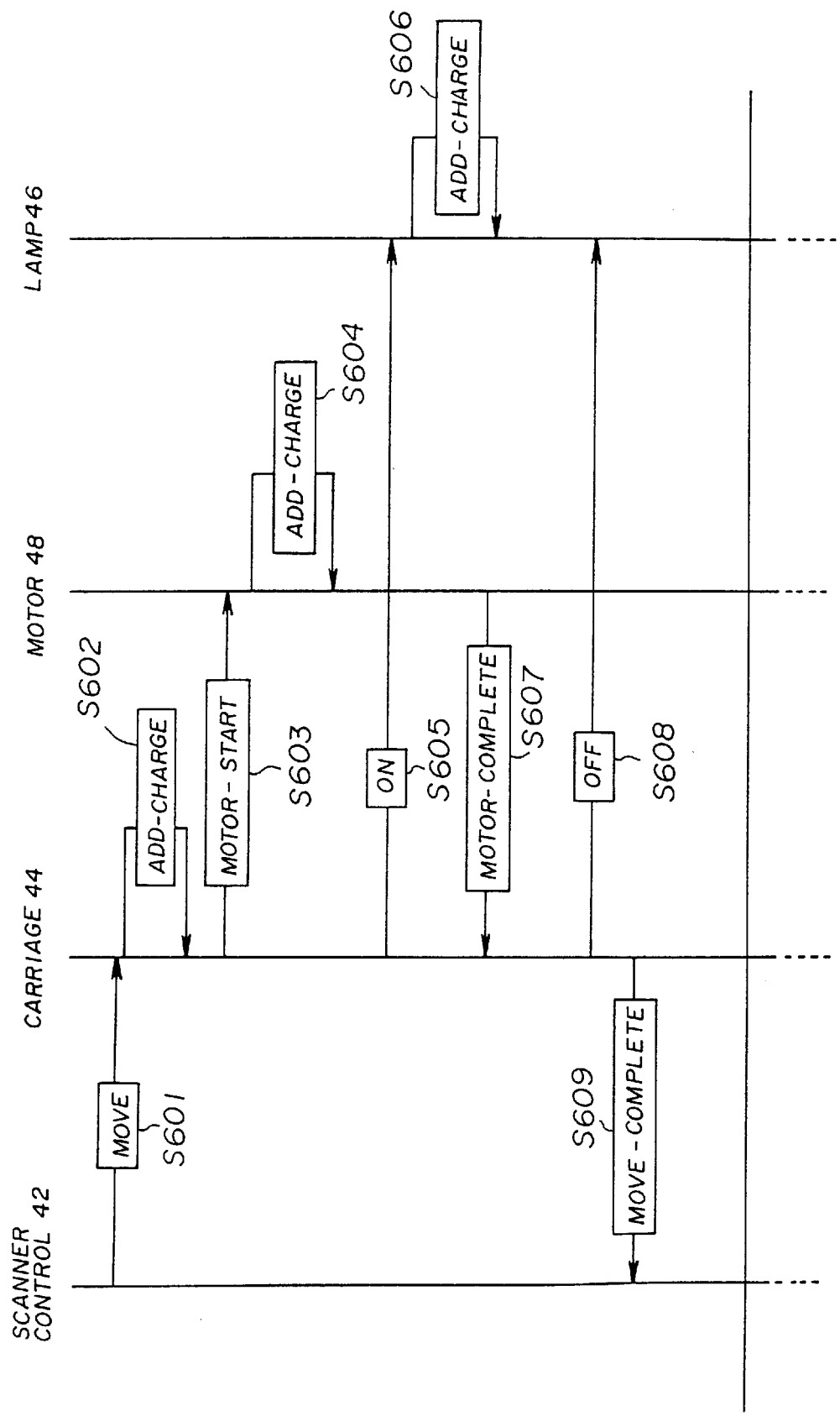
FIG. 6 shows an event trace in a case where a utilization charge is cumulatively increased for each software component having the data structure shown in FIG. 5 in the arrangement of software components shown in FIG. 4.

With reference to FIG. 6, a charging operation performed by each software component will now be described.

In the control system in the embodiment of the present invention, when a user causes software components to run for performing control of printing or software components to run for performing control of reading, the service center 10 charges the user in accordance with the result of the charging function executed for each software component.

A specific event trace when the utilization charge is increased for each software component will now be described.

FIG. 6 shows the event trace in a case where the utilization charge is increased for each software component having the data structure shown in FIG. 5 in the arrangement of software components shown in FIG. 4.

Specifically, as a result of the scanner-control software component 42 being run by the CPU 201, the CPU 201 executes an instruction, included in the scanner-control software component 42, calling for instructions for a predetermined move operation S601, included in the carriage software component 44, for controlling the carriage. Thereby, the instructions for the predetermined move operation S601 are called for and executed by the CPU 201. As a result, the CPU 201 executes an instruction, included in the instructions for the predetermined move operation S601, calling for instructions, included in the carriage software component 44, for a predetermined add-charge operation S602. Thereby, the instructions for the predetermined add-charge operation S602 are called for and executed by the CPU 201, so that the unit price 54 included in the data structure of the carriage software component 44 is added to the utilization charge 55 included in the data structure of the carriage software component 44. Thus, the charging function of the carriage software component 44 is executed. Further, the CPU 201 executes an instruction, included in the instructions for the predetermined move operation S601, calling for instructions for a predetermined motor-start operation S603, included in the motor software component 48, for controlling a carriage motor (a stepper motor or the like). Thereby, the instructions for the predetermined motor-start operation S603 are called for and executed by the CPU 201, so that the carriage motor is controlled by the CPU 201.

As a result, the CPU 201 executes an instruction, included in the instructions for the predetermined motor-start operation S603, calling for instructions for a predetermined add-charge operation S604 included in the motor software component 48. Thereby, the instructions for the predetermined add-charge operation S604 are called for and executed by the CPU 201, so that the unit price 54 included in the data structure of the motor software component 48 is added to the utilization charge 55 included in the data structure of the motor software component 48. Thus, the charging function of the motor software component 48 is executed.

By using the unit price 54, charging is performed for the software components in accordance with the states in which these software components are run, respectively. Thus, as a result of charging being managed for each software component when the software incorporated in the image input/output apparatus 20 is run, it is possible that a user pays charges in accordance with a matter as to which devices are actually used.

Further, as described above, by using the unit price 54, charging is performed for the software components in accordance with the states in which these software components are run, respectively. As a result, it is possible that a user pays the appropriate utilization charges only for the software components which are actually run.

Further, by appropriately replacing or changing the unit price 54 or the component identifier (component ID) 51, charging can be appropriately performed even when a charging method is changed due to replacement or upgrade of any particular software component, or expansion of a function or a special order for an individual function of the product (image input/output apparatus 20) itself which is requested and achieved.

Specifically, in the related art, charging is performed for a function. As a result, when different software components are run for executing the same function, the same charging is performed. In the present invention, such a problem is eliminated. In the present invention, regardless of a matter as to which function (a composite apparatus of copier, facsimile machine, printer, and so forth has many functions) a software component is run for, when the software component is the same, the same charging is performed for the software component. Thus, charging can be managed for each software component.

Further, in the control system in the embodiment of the present invention, as a result of hardware components being related to software components, respectively, the states in which the hardware components are used are managed based on the states in which the software components corresponding to these hardware components are run.

Returning to FIG. 6, as mentioned above, the instructions for the predetermined motor-start operation S603, included in the motor software component 48, for controlling the carriage motor (a stepper motor or the like), are called for and executed by the CPU 201, so that the carriage motor is controlled by the CPU 201. As a result, as mentioned above, the instructions, included in the motor software component 48, for the predetermined add-charge operation S604 are called for and executed by the CPU 201, so that the unit price 54 included in the data structure of the motor software component 48 is added to the utilization charge 55 included in the data structure of the motor software component 48. Thus, the charging function of the motor software component 48 is executed.

Further, the CPU 201 executes an instruction, included in the instructions for the predetermined move operation S601, calling for instructions for a predetermined ON operation S605, included in the lamp software component 46, for turning on the exposure lamps. Thereby, the instructions for the predetermined ON operation S605 are called for and executed by the CPU 201. As a result, the exposure lamps are turned on under the control by the CPU 201. As a result, the CPU 201 executes an instruction, included in the instructions for the predetermined ON operation S605, calling for instructions, included in the lamp software component 46, for a predetermined add-charge operation S606. Thereby, the instructions for the predetermined add-charge operation S606 are called for and executed by the CPU 201, so that the unit price 54 included in the data structure of the lamp software component 46 is added to the utilization charge 55 included in the data structure of the lamp software component 46. Thus, the charging function of the lamp software component 46 is executed.

Then, when the control of the carriage motor is completed, the CPU 201 executes an instruction, included in the motor software component 48, calling for instructions, included in the carriage software component 44, for a predetermined motor-complete operation S607, for reporting the completion of the control of the carriage motor. Thereby, the instructions for the predetermined motor-complete operation S607 are called for and executed by the CPU 201. As a result, the CPU 201 executes an instruction, included in the carriage software component 44, calling for instructions, included in the lamp software component 46, for a predetermined OFF operation S608 for turning off of the exposure lamps. Thereby, the instructions for the predetermined OFF operation S608 are called for and executed by the CPU 201, so that the exposure lamps are turned off under the control by the CPU 201. Further, the CPU 201 executes an instruction, included in the carriage software component 44, calling for instructions, included in the scanner-control software component 42, for a predetermined move-complete operation S609, for reporting the completion of movement of the carriage and turning on and off of the exposure lamps. Thereby, the instructions for the predetermined move-complete operation S609 are called for and executed by the CPU 201.

Thus, the motor software component 48 is run for the control of the carriage motor, and the lamp software component 46 is run for turning on/off of the exposure lamps. Thus, the software components correspond to the hardware components, respectively.

Thereby, charging for use of the hardware components is performed as a result of the charging functions of the corresponding software components being executed, respectively. As a result, it is not necessary to provide a counter for each hardware component for charging therefor. Further, as a result of the use of the hardware components being managed through the corresponding software components, respectively, when the manner of charging for each hardware component is changed, charging for the hardware components can be appropriately performed, by appropriately changing the data of the corresponding software components.

By using the unit price 54 for each software component, charging is performed for the hardware components in accordance with the states in which the corresponding software components are run, respectively. Thus, as a result of charging being managed for each software component when the software incorporated in the image input/output apparatus 20 is run, it is possible that a user pays charges in accordance with a matter as to which hardware components are actually used.

Further, as described above, by using the unit price 54 for each software component, charging is performed for the hardware components in accordance with the states in which the corresponding software components are run. As a result, it is possible that a user pays the appropriate utilization charges only for the software components which are actually run.

Further, by replacing or changing the unit price 54 or the component identifier (component ID) 51, charging can be appropriately performed even when a charging method is changed due to replacement or upgrade of any particular software component or any particular hardware component, or expansion of a function or a special order for an individual function of the product (image input/output apparatus 20) itself which is requested and achieved.

Specifically, in the related art, charging is performed for a function. As a result, when different software components are run for executing the same function, the same charging is performed. In the present invention, such a problem is eliminated. In the present invention, regardless of a matter as to which function (a composite apparatus of copier, facsimile machine, printer, and so forth has many functions) a software component is run for, when the software component is the same, the same charging is performed for the software component. Thus, charging can be managed for each software component corresponding to the respective hardware component.

Figure 7:
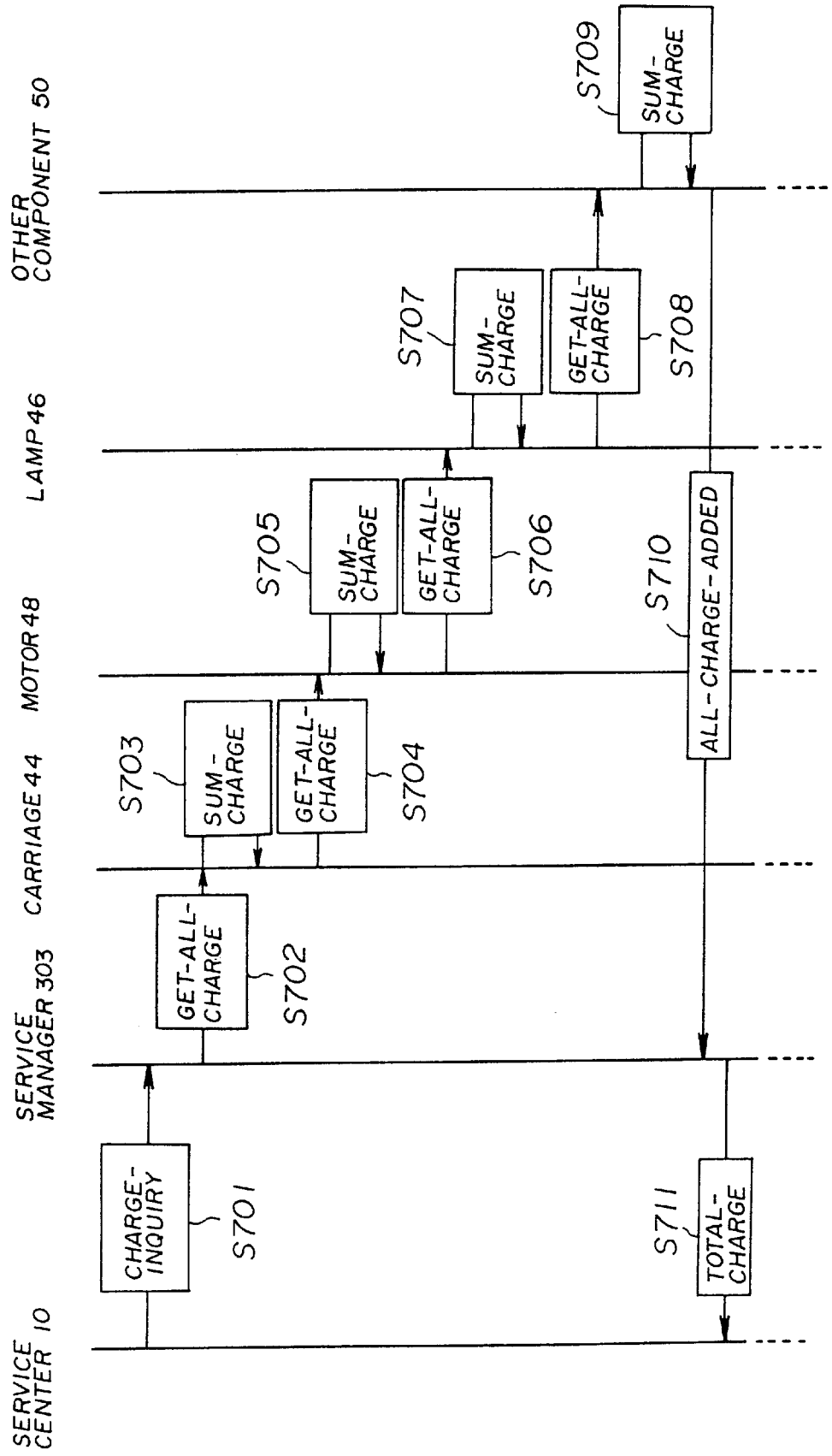
FIG. 7 shows an event trace in a case where the utilization charges of the respective software components are totalized, each software component having the data structure shown in FIG. 5, in the arrangement of software components shown in FIG. 4.

FIG. 7 shows an event trace in a case of performing totalization of the utilization charges of the respective software components, each having the data structure shown in FIG. 5, in the arrangement of software components shown in FIG. 4. FIG. 7 shows the case where the service center 10 includes the broker 22.

In the control system in the embodiment of the present invention, in response to a request for a total utilization charge made by the service center 10, the utilization charges of all the software components which have been run in the image input/output apparatus 20 are totalized, and the service center 10 is informed of the thus-obtained total utilization charge.

The PC 101 of the service center 10 calls for instructions, included in the service manager 303, for a predetermined charge-inquiry operation S701, for requesting data of the total utilization charge. Then, the CPU 201 executes the instructions for the predetermined charge-inquiry operation S701 of the service manager 303. As a result, the CPU 201 executes an instruction, included in the instructions for the predetermined charge-inquiry operation S701, calling for instructions, included in the carriage software component 44, for a predetermined get-all-charge operation S702 for totalizing the utilization charges of all the software components incorporated in the image input/output apparatus 20. Thereby the instructions for the predetermined get-all-charge operation S702 are called for and executed by the CPU 201. As a result, a value '0' is transferred to the carriage software component 44, as an initial value of data of the total utilization charge, as an argument of the instructions for the predetermined get-all-charge operation S702.

As a result of the execution of the get-all-charge operation S702, the CPU 201 executes an instruction, included in the instructions for the get-all-charge operation S702, calling for instructions, included in the carriage software component 44, for a predetermined sum-charge operation S703, which instructions are thereby called for and executed by the CPU 201. As a result, the utilization charge included in the data structure of the carriage software component 44 is added to the transferred data of the total utilization charge. Then, the CPU 201 executes an instruction, included in the instructions for the predetermined get-all-charge operation S702, calling for instructions, included in the motor software component 48, for a predetermined get-all-charge operation S704. Thereby, the instructions for the predetermined get-all-charge operation S704 are called for and executed by the CPU 201. As a result, the data of the total utilization charge, resulting from the addition, is transferred to the motor software component 48, as an argument of the instructions for the predetermined get-all-charge operation S704.

As a result of the execution of the get-all-charge operation S704, the CPU 201 executes an instruction, included in the instructions for the get-all-charge operation S704, calling for instructions, included in the motor software component 48, for a predetermined sum-charge operation S705, which instructions are thereby called for and executed by the CPU 201. As a result, the utilization charge included in the data structure of the motor software component 48 is added to the transferred data of the total utilization charge. Then, the CPU 201 executes an instruction, included in the instructions for the get-all-charge operation S704, calling for instructions, included in the lamp software component 46, for a predetermined get-all-charge operation S706, which instructions are thereby called for and executed by the CPU 201. As a result, the data of the total utilization charge, resulting from the addition, is transferred to the lamp software component 46, as an argument of the instructions for the predetermined get-all-charge operation S706.

As a result of the execution of the get-all-charge operation S706, the CPU 201 executes an instruction, included in the instructions for the get-all-charge operation S706, calling for instructions, included in the lamp software component 46, for a predetermined sum-charge operation S707, which instructions are thereby called for and executed by the CPU 201. As a result, the utilization charge included in the data structure of the lamp software component 46 is added to the transferred data of the total utilization charge. Then, the CPU 201 executes an instruction, included in the instructions for the get-all-charge operation S706, calling for instructions, included in the other software component 50, if any, for a predetermined get-all-charge operation S708, which instructions are thereby called for and executed by the CPU 201. As a result, the data of the total utilization charge, resulting from the addition, is transferred to the other software component 50, as an argument of the instructions for the predetermined get-all-charge operation S708.

In response to the execution of the get-all-charge operation S708, the CPU 201 executes an instruction, included in the instructions for the get-all-charge operation S708, calling for instructions, included in the other software component 50, for a predetermined sum-charge operation S709, which instructions are thereby called for and executed by the CPU 201. As a result, the utilization charge included in the data structure of the other software component 50 is added to the transferred data of the total utilization charge. Then, the CPU 201 executes an instruction, included in the instructions for the get-all-charge operation S708, calling for instructions, included in the service manager 303, for a predetermined all-charge-added operation S710 which instructions are thereby called for and executed by the CPU 201. As a result, the data of the total utilization charge, resulting from the addition, is transferred to the service manager 303 as an argument of the instructions for the predetermined all-charge-added operation S710.

As a result of the execution of the all-charge-added operation S710, the CPU 201 executes an instruction, included in the instructions for the all-charge-added operation S710, calling for instructions, included in software incorporated in the PC 101 (broker 22) of the service center 10, for a predetermined total-charge operation S711, which instructions are thereby called for, and executed by the CPU 223. As a result, the transferred data of the total utilization charge is transferred to the software incorporated in the PC 101 (broker 22) of the service center 10 as an argument of the instructions for the predetermined total-charge operation S711.

In the case where the broker 22 is not included in the service center 10 but any apparatus of the image input/output apparatuses 12 acts as the broker 22, the PC 101 of the service center 10 calls for instructions, included in software incorporated in the broker 22, for a predetermined original-charge-inquiry operation. In response thereto, the broker 22 calls for the instructions for the predetermined charge-inquiry operation S701, included in the service manager 303, for requesting data of the total utilization charge. Then, the CPU 201 executes the instructions for the predetermined charge-inquiry operation S701 of the service manager 303. Then, the instructions for the operations S702, . . . , S710 are executed in sequence, as described above.

Then, as a result of the execution of the all-charge-added operation S710, the CPU 201 executes an instruction, included in the instructions for the all-charge-added operation S710, calling for instructions, included in the software incorporated in the broker 22, for the predetermined total-charge operation S711, which instructions are thereby called for, and executed by the CPU of the broker 22. As a result, the transferred data of the total utilization charge is transferred to the software incorporated in the broker 22 as an argument of the instructions for the predetermined total-charge operation S711. As a result of the execution of the predetermined total-charge operation S711, the CPU of the broker 22 executes an instruction, included in the instructions for the total-charge operation S711, calling for instructions, included in the software incorporated in the PC 101 of the service center 10, for a predetermined total-charge-report operation, which instructions are thereby called for, and executed by the CPU of the PC 101. As a result, the transferred data of the total utilization charge is transferred to the software incorporated in the PC 101 of the service center 10 as an argument of the instructions for the predetermined total-charge-report operation.

In each of the above-described arrangements, each software component, for which the utilization charge should be charged, is registered in the broker 22. Although only the instructions for the respective operations S701 through S711 are chained in the arrangement shown in FIG. 7, the instructions for the respective operations of all the registered software components are chained for each apparatus of the image input/output apparatuses 12, and the utilization change of each software component is cumulatively added in sequence. Thus, the utilization charges of the respective software components are totalized for each apparatus of the image input/output apparatuses 12, and the thus-obtained total utilization charge is reported to the service center 10. The service center 10 further totalizes the thus-obtained total utilization charges of the respective apparatuses of the image input/output apparatuses 12 for each user, as will be described below.

Another arrangement may also be provided in which the respective component identifiers (component ID) 51 are managed by the broker 22, and the broker 22 specifies the component identifiers (component ID) of the respective software components and directly obtains the utilization charges of the respective software components. In this arrangement, registration and management of the software components, for which the utilization charges should be charged, are performed in the broker 22.

Figure 8:
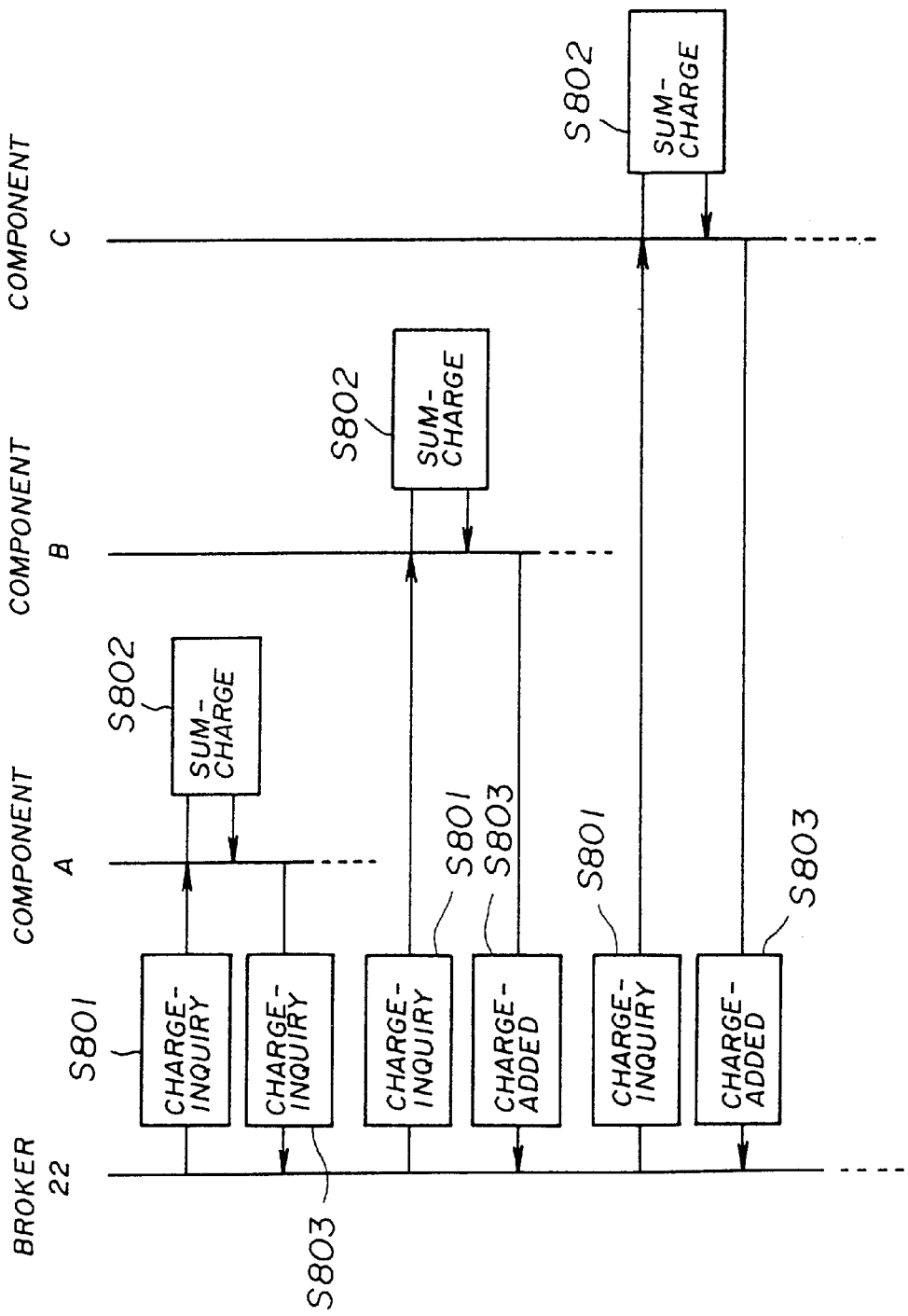
FIG. 8 shows an event trace in a case where instructions of each software component, having the data structure shown in FIG. 5, are called for by a CPU of a broker directly so that the broker obtains the utilization charges of the respective software components, which utilization charges are then totalized by the broker.

In this arrangement, as shown in FIG. 8, the CPU 223 of the broker 22 calls for, using the component identifier (component ID) 51, instructions, included in each software component (A, B, C, . . . ), for a predetermined charge-inquiry operation S801 which instructions are thereby executed by the CPU 201. As a result, a value '0' is transferred to this software component (A, B, C, . . . ), as an initial value of data of the utilization charge, as an argument of these instructions for the predetermined charge-inquiry operation S801. Further, the CPU 201 executes an instruction, included in the instructions for the predetermined charge-inquiry operation S801, calling for instructions, included in this software component (A, B, C, . . . ), for a predetermined sum-charge operation S802, which instructions are thereby called for and executed by the CPU 201. As a result, the utilization charge included in the data structure of this software component (A, B, C, . . . ) is added to the transferred data of the utilization charge.

Then, the CPU 201 executes an instruction, included in the instructions for the predetermined charge-inquiry operation S801 of this software component (A, B, C, . . . ), calling for instructions, included in software incorporated in the broker 22, for a predetermined charge-added operation S803, which instructions are thereby called for, and executed by the CPU 223. As a result, the data of the utilization charge, resulting from the addition, is transferred to the CPU 223 as an argument of the instructions for the predetermined charge-added operation S803. The CPU 223 of the broker 22 totalizes, for each apparatus of the image input/output apparatuses 12, the data of the utilization charges thus transferred from the respective software components (A, B, C, . . . ). The result of the totalization is reported to the service center 10, as a result of the instructions, included in the software incorporated in the PC 101 of the service center 10, for the predetermined total-charge-report operation being called for, as described above, in the case where the service center 10 does not include the broker 22 and any one of the image input/output apparatuses 12 acts as the broker 22.

In the embodiment of the present invention (each of the arrangement shown in FIG. 7 and the arrangement shown in FIG. 8), the utilization charges of the respective software components are totalized for each apparatus, and the thus-obtained total utilization charge for each apparatus is reported to the service center 10 via the network 14. However, in the case where the broker 22 is included in the service center 10 in the arrangement shown in FIG. 8, the data of the utilization charge is transferred to the broker 22 from each software component via the network. The service center 10 has information as to which apparatus of the image input/output apparatuses 12 belongs to each user, and totalizes the total utilization charges of the respective apparatuses which belong to the same user. As a result, it is possible to separate the utilization charge of each software component and the total of charges which each user is charged. This is because the utilization charges of the respective software components are included in each apparatus of the image input/output apparatuses 12, while the total of charges which each user is charged is included in the service center 10 which is connected with each apparatus of the image input/output apparatuses 12 via the network 14. Thereby, charging can be performed appropriately, even when the charging method in accordance with the utilization state of the user is changed due to expansion of functions and/or upgrade of apparatuses, as a result of the software components being appropriately changed, the data of the respective software components being appropriately changed, the sum of the total utilization charges of the respective apparatuses for each user being appropriately changed and/or the like.

Thus, in the above-described embodiment, as a result of charging being managed for each software component when the software incorporated in the image input/output apparatus 20 is run, it is possible that a user pays charges in accordance with a matter as to which devices are actually used.

Further, it is possible that a user pays the appropriate utilization charges only for the software components which are actually run.

Further, charging can be appropriately performed even when a charging method is changed due to replacement or upgrade of any particular software component, or expansion of a function or a special order for an individual function of the product (image input/output apparatus 20) itself which is requested and achieved.

Specifically, in the related art, charging is performed for a function. As a result, when different software components are run for executing the same function, the same charging is performed. In the embodiment of the present invention, such a problem is eliminated. In the embodiment of the present invention, regardless of a matter as to which function (a composite apparatus of copier, facsimile machine, printer, and so forth has many functions) the software components are run for, charging can be managed for each software component.

In the arrangement shown in FIG. 1A, it is possible that a user uses any apparatus of the image input/output apparatuses 12 as an operation terminal, for example, and, therethrough, performs a function by using at least one of the image input/output apparatuses 12. For example, the user uses the server B 121 as the operation terminal, and, therethrough, performs a copying function by using, via the network 14, as is necessary, the server A 122, the server B 121 and the scanner 123. Specifically, the scanner 123 is used for reading an original image, the server A 122 is used for editing (magnifying, minifying, sorting, etc.) the thus-read original image, and the server B 121 is used for printing out the thus-edited image.

In this case, in each of the scanner 123, server A 122 and the server B 121, the CPU thereof runs the appropriate software components so as to perform the above-mentioned function. As a result, the charging function of each software component is executed, as shown in FIG. 6. Specifically, the unit price 54 is added to the utilization charge 55 in the data structure of each software component. Then, the thus-obtained utilization charges 55 of the respective software components are collected, as shown in FIG. 7, or as shown in FIG. 8. In the arrangement in which the instructions for the respective operations are chained, as shown in FIG. 7, the software components of each of the respective apparatuses 123, 122 and 121 are chained, so that the utilization charges of the respective software components are totalized for each of the respective apparatuses 123, 122 and 121. In the arrangement in which the instructions for the operation of each software component are called for by the broker 22, as shown in FIG. 8, the instructions for the operation of each software component of the software components incorporated in each of the respective apparatuses 123, 122 and 121 are called for by the broker 22, so that the utilization charges of the respective software components are collected, and totalized by the broker 22 for each of the respective apparatuses 123, 122 and 121.

Further, the present invention is not limited to the above-described embodiments, and variations and modifications may be made without departing from the scope of the present invention.

The contents of the basic Japanese Patent Application No. 10-051823, filed on Mar. 4, 1998, are hereby incorporated by reference.

What is claimed is:

1. A control system, comprising:
   at least one storage unit in which software is stored, said software being divided into a plurality of software components; and
   at least one CPU which controls hardware components of an image processing apparatus by running said plurality of software components cooperatively,
   wherein each software component of said plurality of software components has a charging function such that a charge for said software component is cumulatively increased in accordance with a state in which said software component is run.

2. The control system as claimed in claim 1, wherein each software component of said plurality of software components has a data structure which includes a component identifier which is previously registered for said software component, and a unit price which is added to the charge for said software component each time said software component is run.

3. The control system as claimed in claim 1, wherein said plurality of software components comprise software components, each of which is run for controlling a respective one of said plurality of hardware components.

4. The control system as claimed claim 1, wherein the charges of respective software components of said plurality of software components are totalized as a result of instructions of said respective software components being chained.

5. The control system as claimed in claim 1, wherein the charges of respective software components of said plurality of software components are totalized as a result of instructions of each of said respective software components being directly called for by one of said CPU and another CPU.

6. A control system comprising:
   a plurality of image processing apparatuses, in each of which software is incorporated, which software is divided into a plurality of software components, which are run so that functions of said apparatus are executed, each software component of said plurality of software components having a charging function such that a charge for said software component is cumulatively increased in accordance with a state in which said software component is run; and
   a service center which is connected with said plurality of image processing apparatuses, said service center totalizing, for each user, the charges of the respective software components incorporated in said plurality of image processing apparatuses.

7. A control method comprising the steps of:
   a) controlling hardware components of an image processing apparatus by running a plurality of software components cooperatively, wherein each of said plurality of software components contains a charging function; and
   b) cumulatively increasing a charge for each software component of said plurality of software components in accordance with a state in which said software component is run.

8. The control method as claimed in claim 7, wherein each software component of said plurality of software components has a data structure which includes a component identifier which is previously registered for said software component, and a unit price which is added to the charge for said software component each time said software component is run.

9. The control method as claimed in claim 7, wherein said plurality of software components comprise software components, each of which is run for controlling a respective one of said plurality of hardware components.

10. The control method as claimed claim 7, further comprising the step of totalizing the charges of respective software components of said plurality of software components, by chaining instructions of said respective software components.

11. The control method as claimed in claim 7, further comprising the step of totalizing the charges of respective software components of said plurality of software components, by calling for instructions of each of said respective software components directly.

12. A control method comprising the steps of:
   controlling a plurality of image processing apparatuses by running a plurality of software components included in each of said plurality of image processing apparatuses, each software component of said plurality of software components having a charging function such that a charge for said software component is cumulatively increased in accordance with a state in which said software component is run; and
   totalizing, in a service center which is connected with said plurality of image processing apparatuses, for each user, the charges of the respective software components incorporated in said plurality of image processing apparatuses.

13. A storage unit, in which a plurality of software components are stored, wherein each of said plurality of software components contains a charging function, said plurality of software components being run by a CPU so that:

hardware components of an image processing apparatus are controlled; and a charge for each software component of said plurality of software components is cumulatively increased in accordance with a state in which said software component is run.

* * * * *